US007130286B2

(12) United States Patent
Koodli et al.

(10) Patent No.: US 7,130,286 B2
(45) Date of Patent: Oct. 31, 2006

(54) SYSTEM AND METHOD FOR RESOURCE AUTHORIZATIONS DURING HANDOVERS

(75) Inventors: Rajeev Koodli, Sunnyvale, CA (US); Charles E. Perkins, Saratoga, CA (US); Vijay Devarapalli, Santa Clara, CA (US)

(73) Assignee: Nokia Corporation, Espoo (FI)

( * ) Notice: Subject to any disclaimer, the term of this patent is extended or adjusted under 35 U.S.C. 154(b) by 28 days.

(21) Appl. No.: 10/264,285

(22) Filed: Oct. 2, 2002

(65) Prior Publication Data

US 2004/0066764 A1    Apr. 8, 2004

(51) Int. Cl.
*H04Q 7/00*    (2006.01)

(52) U.S. Cl. .................................. 370/331; 455/436

(58) Field of Classification Search .............. 370/331, 370/338, 401, 450, 909, 328; 455/436, 433, 455/437; 713/155, 159, 173
See application file for complete search history.

(56) References Cited

U.S. PATENT DOCUMENTS

| 5,953,419 | A  | * | 9/1999  | Lohstroh et al. ............. 713/165 |
| 5,978,475 | A  | * | 11/1999 | Schneier et al. ............. 713/177 |
| 6,370,380 | B1 |   | 4/2002  | Norefors et al. ............. 455/436 |
| 6,418,130 | B1 |   | 7/2002  | Cheng et al. |
| 6,948,063 | B1 | * | 9/2005  | Ganesan et al. ............. 713/168 |
| 2002/0098840 | A1 | * | 7/2002  | Hanson et al. ............. 455/435 |
| 2002/0152393 | A1 | * | 10/2002 | Thoma et al. ............. 713/189 |
| 2002/0197979 | A1 | * | 12/2002 | Vanderveen ................. 455/410 |

FOREIGN PATENT DOCUMENTS

| WO | WO-01/26322 A2 | 4/2001 |
| WO | WO-2004/003677 A2 | 1/2004 |

OTHER PUBLICATIONS

Charles Perkins, Mobile IP, dated May 1997, IEE Communication Magazine pp. 84-99.*
Seamoby Working Group: Internet Draft; IETF: Rajeev Koodli and Charles E. Perkins; *A Context Transfer Protocol for Seamless Mobility*; Feb. 27, 2002; pp. 1-50.
IPng Working Group: Internet Draft; IETF: Patrik Flykt, Charles E. Perkins, Thomas Eklund; *AAA for IPv6 Network Access* Mar. 1, 2002; pp. 1-47.
Flykt, P.et al, Working Group Internet Draft, AAA for IPV6 Network Access, Mar. 1, 2002, pp. 1-47.
European Patent Office Supplemental European Search Report dated Feb. 9, 2006.

* cited by examiner

*Primary Examiner*—Doris H. To
*Assistant Examiner*—Robert W. Wilson
(74) *Attorney, Agent, or Firm*—Darby & Darby P.C.; Jamie L. Wiegand

(57) ABSTRACT

A system and method is provided that enables the transfer of policy resource tokens (PRT) in the process of a handover of a mobile node in a wireless network. The system includes a granting agent that grants the PRT to a first access router to enable the mobile node to access network resources. In one embodiment, in the process of handing over the mobile node, the first access router provides the PRT to the second access router, thereby reducing data latency, and a disruption for an application executing on the mobile node. In another embodiment, the mobile node provides the PRT to the second access router after connectivity is established. A PRT data structure also is provided that includes a data field of profile types. A profile type describes context authorization information for granting access to a network resource.

39 Claims, 5 Drawing Sheets

SYSTEM AND METHOD FOR RESOURCE AUTHORIZATIONS DURING HANDOVERS

FIELD OF THE INVENTION

The present invention relates to network authorizations, and more particularly to a system and method for resource authorization during handovers.

BACKGROUND OF THE INVENTION

The mobile IP protocol enables a mobile node to move freely from one point of connection to another in various networks it visits along its route. When the mobile node attaches to a visited network, it may need to perform protocol operations to obtain authenticated network access. Once the mobile node is authorized to access the visited network, it may then engage in communications that might require support for features such as Quality of Service (QoS), header compression, buffering, and security. Typically, a mobile node would communicate a request for such features at its point of connection to the visited network. However, the visited point of connection may need to ensure that the mobile node is appropriately authorized by a trusted agent, such as a domain Authentication, Authorization, and Accounting (AAA) server or the like, prior to actually enabling the requested features.

When a mobile node leaves the current visited point of connection and attaches to a new point of connection for another visited network, the mobile node must often repeat the operations to obtain authenticated network access. Furthermore, the new visited point of connection may also need to determine if the mobile node is appropriately authorized to access the requested features. However, during the movement of the mobile node from one connection point to another there should be minimal disruption to an application running on the mobile node. Unfortunately, a disruption may arise due to response latency, packet loss, and the like, during a handover of the mobile node from one point of connection to another point of connection. Thus, it is with respect to these considerations and others that the present invention has been made.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to an apparatus for enabling the transfer of a policy resource token (PRT) in the process of a handover of a mobile node in a wireless network. The apparatus manages access to a network resource, and includes a network interface and a router. The network interface employs a packet-based protocol to send and receive packets. The router enables a mobile node to access the network resource, by performing actions including forwarding a request for access to the network resource, receiving a token in response to the request, and enabling the mobile node to access the network resource associated with the token. If the mobile node is handed over to another router, the router actions include providing the token to the other router. The other router employs the provided token to enable the mobile node to access the network resource.

Another aspect of the invention is directed to managing access a network resource. A method receives a request for access to the network resource, provides a token to a first router in response to the request, and enables a mobile node to access the network resource associated with the token. If the mobile node is handed over to a second router, the token is forwarded to the second router. The second router employs the forwarded token to enable the mobile node to access the network resource.

Another aspect of the invention is directed to enabling a mobile node to access a network resource. The system includes an agent, a first router, and a second router. The agent is configured to provide a token in response to a request for access to the network resource. The first router is configured to forward the request for access to the network resource to the agent, and to employ the token to enable the mobile node to access the network resource. If the mobile node is handed over to the second router, the second router receives the token. The second router then employs the received token to enable the mobile node to access the network resource.

Still another aspect of the invention is directed to a computer-readable medium encoded with a data structure for use in enabling a mobile node to access a plurality of network resources. The data structure includes a first data field, a second data field, and a third data field. The first data field includes an address of a mobile node when the mobile node is associated with a previous router. The second data field includes an address of the mobile node when the mobile node is associated with a new router. The third data field includes a token that includes information for granting access to at least one of the plurality of network resources.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENTS

Figure 1:
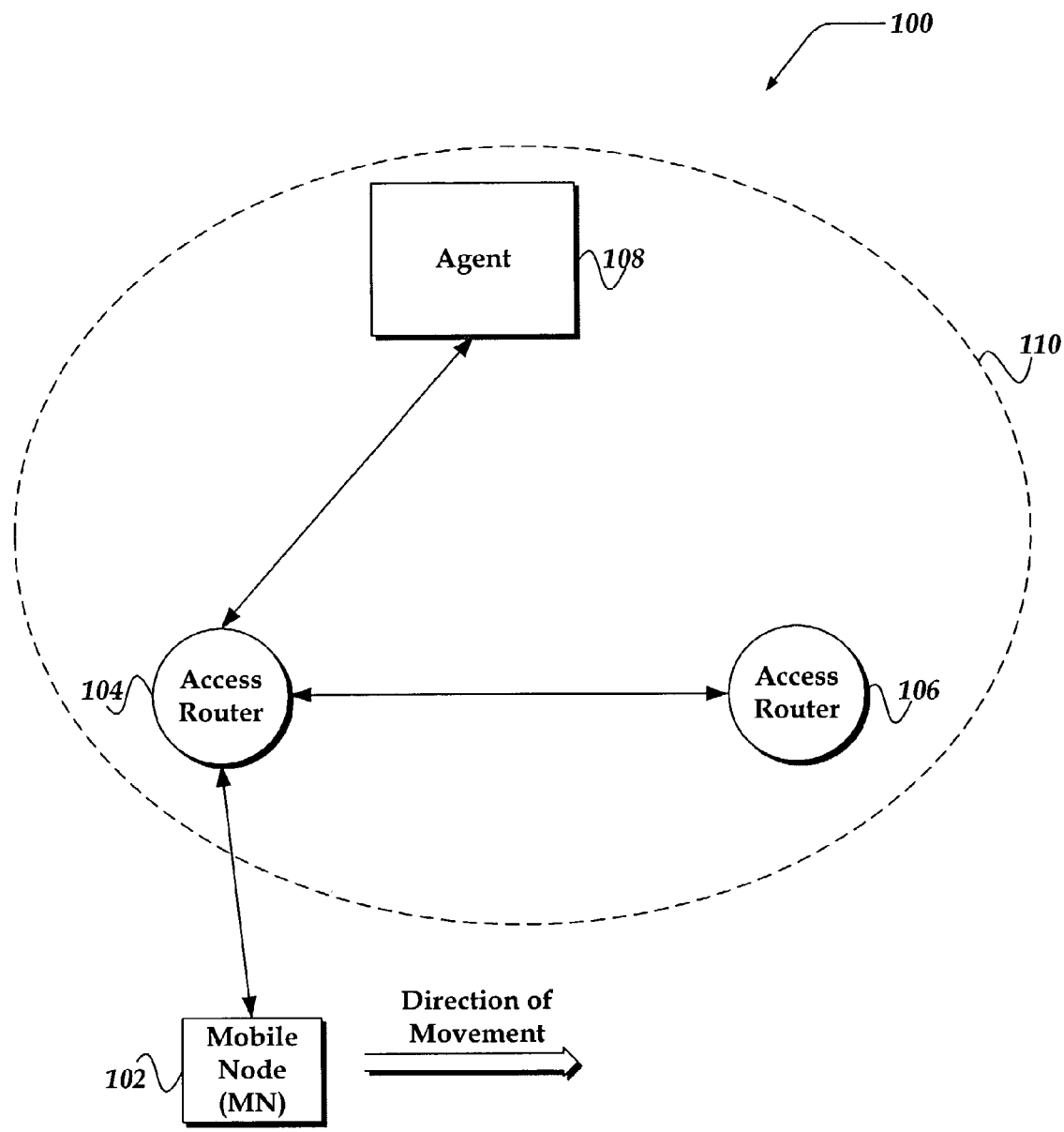
FIG. 1 illustrates a functional block diagram of one embodiment of a general architecture of a mobile IP network.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "flow" refers to a flow of packets.

The term "router" refers to a dedicated network element that receives packets and forwards them towards the destination. In particular, a router is used to extend or segment networks by forwarding packets from one subnet to another. A router typically operates at layer 3 TCP/IP of the Open Systems Interconnection (OSI) reference model for networking. However, some routers can provide additional functionality that operates above layer 3 of TCP/IP or OSI reference model.

The term "access router" refers to a router that is associated with a mobile node for providing IP connectivity between the mobile node and other nodes on an IP network, such as a correspondent node. Although the access router is a dedicated network element coupled to an IP network, it may also be in communication with one or more points of attachment for a wireless network.

The term "Mobile Node" refers to a wireless device that changes its point of attachment from one network or subnetwork to another. A mobile node may change its location without losing connectivity and without changing its IP address; it may continue to communicate with other Internet nodes at any location using its (constant) IP address, assuming link-layer connectivity to a point of attachment is available. A mobile node is given a long-term home IP address on a home network. This home address is administered in substantially the same way as a "permanent" IP address is provided to a stationary host. A mobile node can change its point of attachment from one link to another, while still being reachable via its home address.

The term "security association" refers to a logical connection between two devices or parties transferring data. A security association may provide data protection for network traffic between the parties through various security protocols, such as IPSec protocols, or the like.

Additionally, a reference to the singular includes a reference to the plural unless otherwise stated or is inconsistent with the disclosure herein.

Briefly stated, the present invention enables a transfer of a policy resource token (PRT) if a mobile node is handed over from one access router to another access router in a network. The system includes an agent that provides the PRT to the current access router. The PRT includes information associated with the network resources that the mobile node is authorized to access. The current access router employs the PRT to enable the mobile node to access network resources. In one embodiment, during the handover, the current access router provides the PRT to a new access router, thereby reducing data latency, and minimizing the disruption for an application executing on the mobile node. It is assumed that both the current and the new access routers have access to a public key of the agent for decrypting the PRT. In another embodiment, the mobile node provides the PRT to the new access router after connectivity is established. A PRT data structure also is provided that includes a data field of profile types. The profile types describe authorization information for enabling access to network resources.

Illustrative Environment

FIG. 1 illustrates a functional block diagram of one embodiment of a general architecture of a mobile IP network in which the invention may operate. As shown in the figure, the mobile IP network 100 includes mobile node (MN) 102, access routers 104 and 106, agent 108, and authorization domain 110. Authorization domain 110 includes agent 108, and access routers 104 and 106. Mobile IP network 100 may include many more components than those shown in FIG. 1. However, the components shown are sufficient to disclose an illustrative embodiment for practicing the present invention.

As further shown in the figure, MN 102 is in communication with access router 104. MN 102 may communicate with access router 104 through a radio access network (not shown) that is configured to transport information to and from devices capable of wireless communication.

Generally, MN 102 may include any device capable of connecting to a wireless network such as mobile IP network 100. Such devices include cellular telephones, smart phones, pagers, radio frequency (RF) devices, infrared (IR) devices, integrated devices combining one or more of the preceding devices, and the like. MN 102 may also include other devices that have a wireless interface, such as Personal Digital Assistants (PDAs), handheld computers, personal computers, multiprocessor systems, microprocessor-based or programmable consumer electronics, network PCs, wearable computers, and the like.

Current access router 104 is in communication with new access router 106. Access routers 104 and 106 are typically point of attachment devices on a communications network providing IP (packet-based) connectivity between MN 102 and other nodes on an IP network. On a single network linking many computers through a mesh of possible connections, access routers 104 and 106 receive transmitted messages and forward them to their correct destinations over available routes. On an interconnected set of LANs, including those of differing architectures and protocols, access routers 104 and 106 may act as bridges or links within LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDN), Digital Subscriber Lines (DSLs), wireless links, or other communications links.

In addition to routing functionality, access routers 104 and 106 may also provide other actions, such as packet filtering, and attendant actions. Attendant actions include extracting of authentication information provided by MN 102 and forwarding them to agent 108 for verification. Access routers 104 and 106 employ authorization information (described in more detail below) provided by agent 108 to enable MN 102 to access network resources.

Agent 108 is in communication with access router 104 (and although not shown, new access router 106). Agent 108 provides identity verification of MN 102 when MN 102 is connected to an access router (104 or 106) within its authorization domain 110. Agent 108 may be programmed to include authentication, authorization, and accounting rules associated with the authorization domain 110. Agent 108 thereby enforces authorization rules to help ensure end-to-end quality of service (QoS) for users. Thus, agent 108 provides authorization information to a requesting access router that enables a mobile node to access network resources.

Agent 108 may be programmed differently under different networks. In one embodiment of the invention, agent 108 is an Authorization, Authentication, and Accounting (AAA) server. Agent 108 may also be configured as a Kerberos server, a Remote Authentication Dial-In User Service (RADIUS) server, or other similar configurations that provide authentication and authorization to resources within its authorization domain.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Generalized Operation

Figure 2:
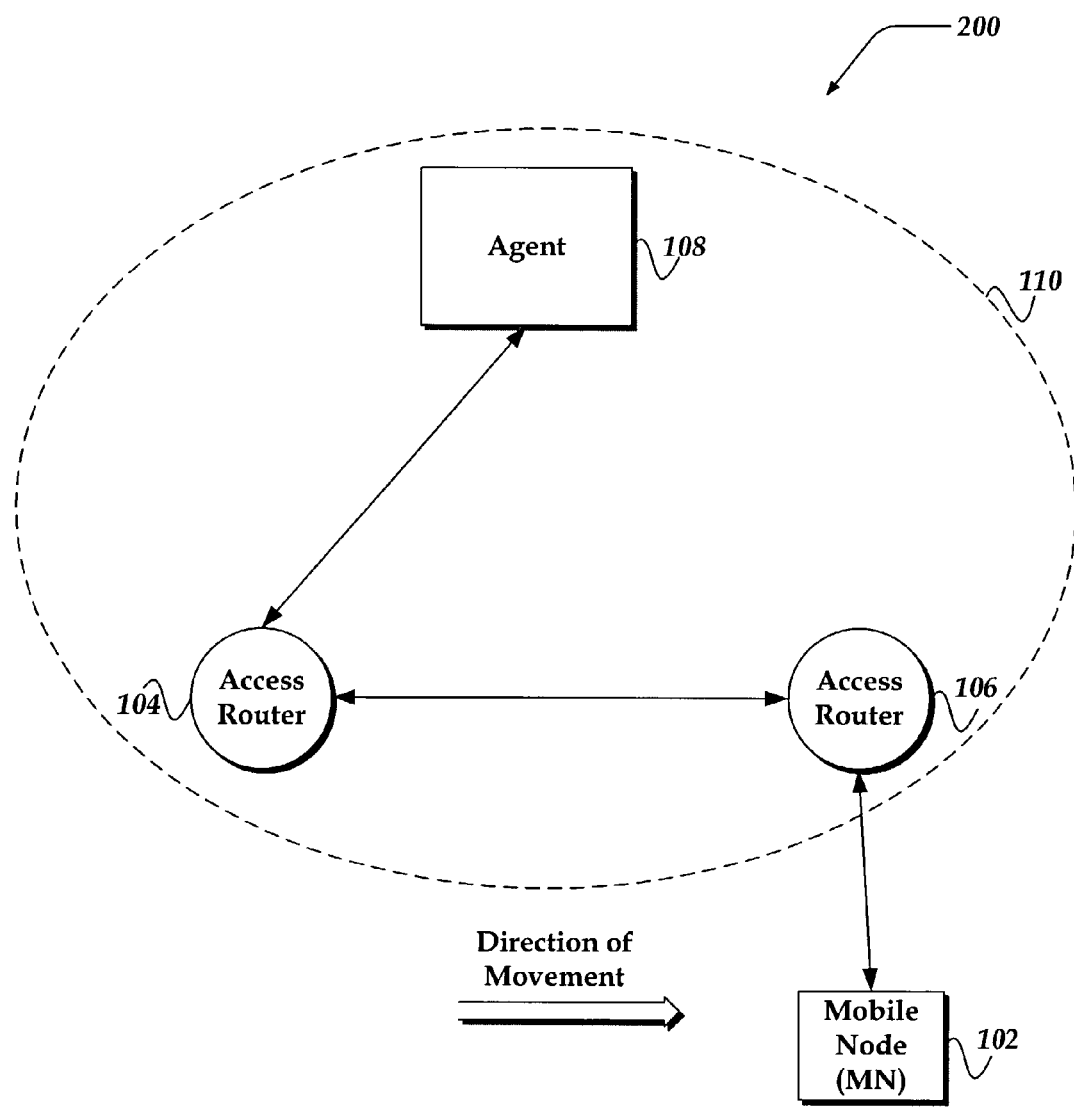
FIG. 2 illustrates a functional block diagram of one embodiment of the mobile IP network of FIG. 1 if the mobile node is handed over.

FIGS. 1 and 2 are schematic diagrams that illustrate a generalized overview for enabling a mobile node to access network resources. A policy resource token (PRT) is described that enables resource authorizations if the mobile node is handed over from a current access router to a new access router. Providing the PRT to the new access router helps reduce data latency that may arise if the mobile node seeks access to a resource through the new access router. Additionally, the present invention may be employed where no resource authorization mechanism exists.

Referring to FIG. 1, when MN 102 first associates with a network, it must request authenticated network access. Once MN 102 has attached to the network through current access router 104, MN 102 may engage in communications that may require support of such resources as Quality of Service (QoS)), header compression, buffering, security, and the like. Typically, MN 102 communicates such a request for a resource to current access router 104. An identifier of MN 102 is associated with the request for resources. In one embodiment of the invention, the identifier is an IP6 address of MN 102 on current access router 104. In another embodiment, the identifier is MN 102's network access identifier (NAI).

Upon receiving the request, current access router 104 may wish to ensure that MN 102 is appropriately authorized by a trusted entity, before providing access to the requested resource. Therefore, current access router 104 forwards the request to agent 108. Current access router 104 may communicate the request to agent 108 via a series of secured authorization protocol exchanges. In one embodiment, current access router 104 communicates the request for a resource via an AAA Client Request (ACR) to agent 108 using the AAA protocol.

If MN 102 is not within its home domain, agent 108 may forward the request to an agent (not shown) in the home domain (not shown) for which MN 102 belongs. The home agent of MN 102 authenticates MN 102 and provides agent 108 with sufficient information for agent 108 to determine authorization. Agent 108 in turn communicates a policy resource token (PRT) to current access router 104. The PRT is described in more detail below in conjunction with FIG. 5. Briefly, however, the PRT includes agent 108's identity, the MN 108's identity, and information representing the resource that the mobile node is eligible to access. Typically, the PRT includes information associated with more resources than MN 102 may request. However, by providing additional information in the PRT, current access router 104 need not make multiple requests for authorization to agent 108.

In one embodiment, the PRT communicated to current access router 104 is associated with an AAA Client Answer (ACA) using the AAA protocol. In another embodiment of the invention, the PRT is also communicated to MN 102.

The PRT is typically encrypted and cryptographically signed by agent 108 to ensure its integrity and source authenticity. In one embodiment, agent 108 employs a Keyed-Hashing for Message Authentication (HMAC) secret key authentication algorithm in conjunction with a Secure Hash Algorithm (SHA), a Message Hash Digest 5 (MD5), or the like. However, the invention is not limited to HMAC algorithms, and any other mechanism providing message integrity and authentication may be employed, without departing from the scope or spirit of the present invention.

The public encryption key associated with agent 108 is available to current access router 104 and 106, as well as MN 102, so they may decrypt the PRT and confirm its integrity and origin.

Current access router 104, employs information within the PRT to ensure that a request from MN 102 is authorized prior to enabling access to the resources. Moreover, with a successful authentication and authorization a distribution of security keys is provided between current access router 104 and MN 102 to secure their communications.

As MN 102 moves away from current access router 104, a handover to another access router may be required. A handover to another access router may also arise for a variety of other reasons. For example, a handover may arise while balancing loads across access routers. In any event, however, it is desired that applications executing on MN 102 that are employing the requested resources operate with minimal disruptions as a result of the handover process. A disruption may arise because the new access router must again obtain information to determine whether MN 102 is authorized to access a network resource. The present invention is directed towards minimizing such a disruption by providing the PRT to the new access router. The new access router then may employ the PRT to enable MN 102 to continue access to the resources, thereby reducing potential data latencies and similar application disruptions.

FIG. 2 illustrates a functional block diagram of one embodiment of the mobile IP network of FIG. 1 if the mobile node is handed over to new access router 106.

If it is determined that MN 102 is handed over to new access router 106, current access router 104 determines whether a common security association is established with new access router 106. The common security association enables current access router 104 to provide information, such as the PRT, to new access router 106 in a secure manner.

If current access router 104 determines that it does not have a common security association with new access router 106, it may elect not to communicate the PRT. Handover of MN 102 still occurs; however, new access router 106 then forwards a new request for access to resources to agent 108.

In one embodiment, MN 102 may provide the PRT, thereby alleviating the need for access router 106 to communicate with agent 108.

If current access router 104 determines that it does have a common security association with new access router 106, current access router 104 provides the PRT to new access router 106. In one embodiment, current access router 104 provides the PRT associated with a Seamless Handover Reply (SHREP) option in a HI message to new access router 106. The SHREP option message packet is described in more detail below in conjunction with FIG. 4.

In another embodiment of the invention, the PRT may be provided to new access router 106 by MN 102. After MN 102 establishes connectivity with new access router 106, MN 102 may provide to new access router 106 the PRT associated with a Seamless Handover Initiate Destination (SHIN) option message.

In either event, upon receipt of the PRT, new access router 106 decrypts the PRT employing the public encryption key associated with agent 108. New access router 106 then ensures that a resource requested by MN 102 is authorized by agent 108. If the requested resource is authorized for access by MN 102, new access router 106 enables MN 102 access to the resource.

Figure 3:
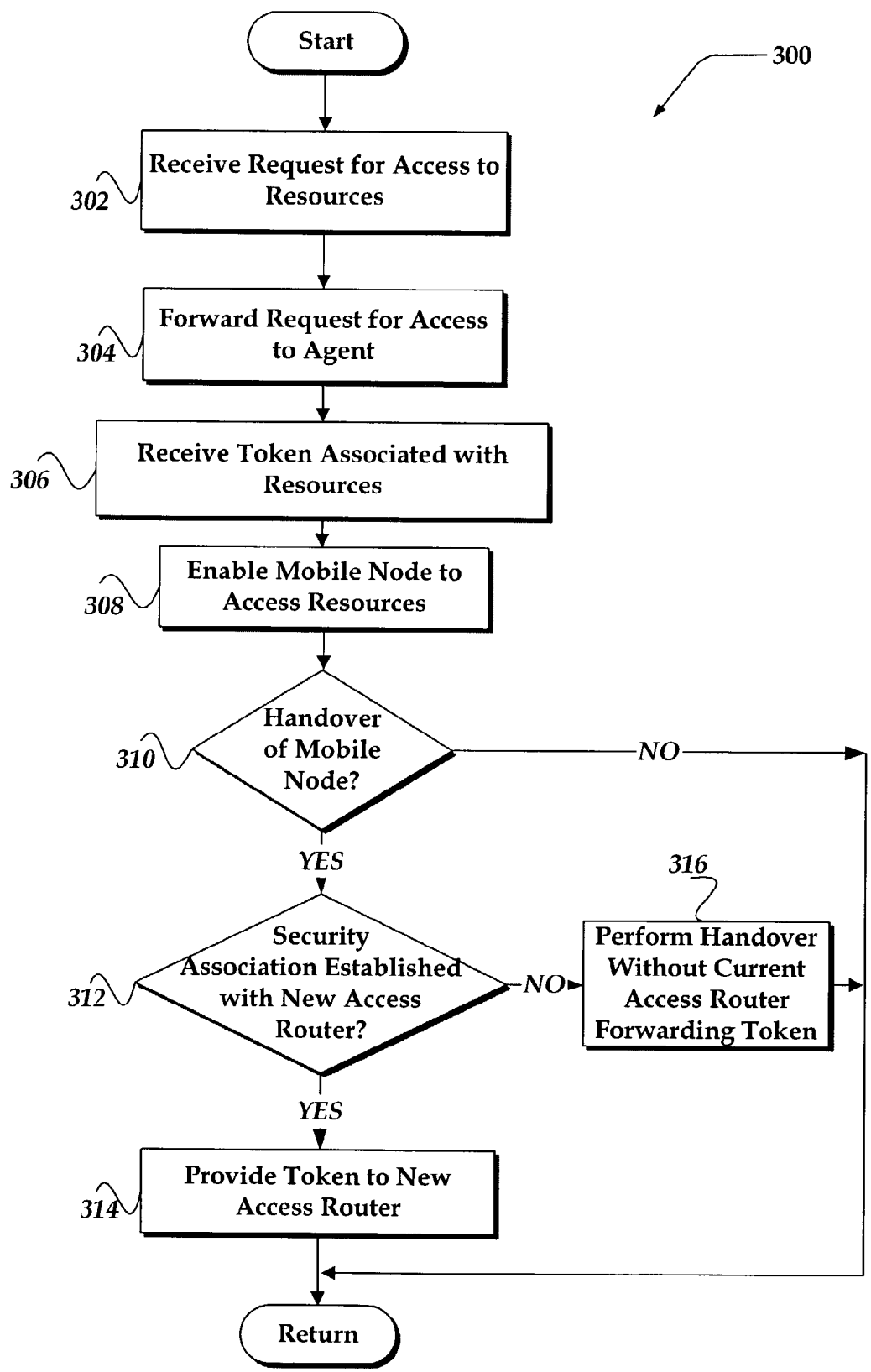
FIG. 3 illustrates a flow diagram generally showing one embodiment of a process for managing access to a network resource adapted for IPv6 wireless networks.

FIG. 3 illustrates a flow diagram generally showing an overview of a process for managing access to a network resource adapted for an IPv6 wireless network, such as mobile IP network 100 shown in FIG. 1.

As shown in FIG. 3, after a start block, the process moves to block 302, where a request for access to a resource is received by a current access router that a mobile node associates with in an authorization domain. The request for access includes identification information about the requesting mobile node. The process flow proceeds to block 304, where the request for access may be forwarded to an agent configured to provide authorization for the requested resource.

Next, the process proceeds to block 306, where a token is received that is associated with the resource that the mobile node is authorized to access. In one embodiment of the invention, the token is associated with an Internet Control Message Protocol (ICMP) Authorization, Authentication, and Accounting (AAA) Client Answer (ACA) that is communicated from the agent. The token is typically a policy resource token (PRT) that includes the agent's identity, the mobile node's identity, and information representing at least one resource that the mobile node is eligible to access. One embodiment of the PRT is described in more detail below in conjunction with FIG. 5.

The process continues to 308, where the first router employs the received token to enable the mobile node to access at least one authorized resource. Process 300 continues to decision block 310 where a determination is made whether the mobile node is to be handed over to a new access router. At decision block 310, if it is determined that the mobile node is not to be handed over to the new access router, the process returns to performing other actions. In one embodiment, if the mobile node moves without engaging in a handover by the current access router, then upon connecting, the mobile node presents the PRT to the new access router.

Alternatively, if at decision block 310, it is determined that the mobile node is handed over to the new access router, the process proceeds to decision block 312, where a determination is made whether the current access router shares a common security association with the new access router. If it is determined that no common security association is established with the new access router, the process proceeds to block 316. At block 316, the handover of the mobile node to the new access router proceeds, without forwarding of the token. In one embodiment, upon connecting, the mobile node provides the PRT to the new access router. The process then returns to performing other actions.

Alternatively, at decision block 312, if it is determined that a common security association is established with the new access router, the process continues to block 314, where the token is provided to the new access router. Since the token is provided to the new access router, further authorization actions are unnecessary before the new access router may enable access to at least one network resource for the mobile node.

In one embodiment of the invention, the current access router associates the token with an ICMP Seamless Handover Replay (SHREP) option in an HI message to the new access router. One embodiment of a SHREP message is described in more detail below in conjunction with FIG. 4. For replay protection identification fields are included in the HI message.

In another embodiment of the invention, the token is provided to the mobile node by the current access router. The mobile node may communicate the token associated with a Seamless Handover Initiate Destination (SHIN) option message to the new access router after the mobile node establishes connectivity with the new access router.

In either event, upon completion of block 314, the process returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 4:
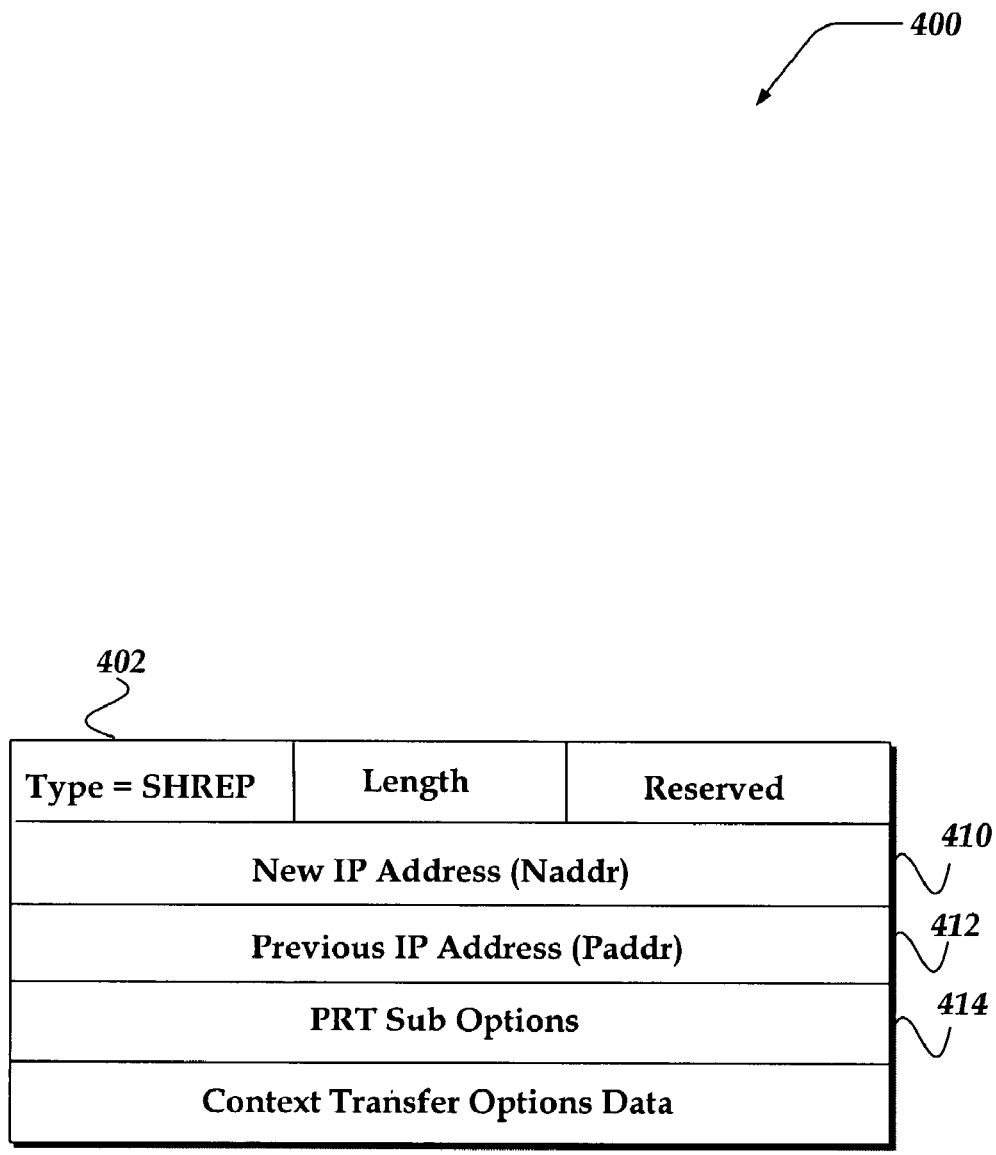
FIG. 4 is a graphical representation of a data structure or packet for use in communicating a policy resource token.

FIG. 4 is a graphical representation of a data structure or packet for use in communicating a policy resource token (PRT).

As shown in the figure, message packet 400 includes fields for a type 402, a new IP Address (Naddr) 410, a Previous IP Address (Paddr) 412, and a PRT Sub Option 414. Message packet 400 may include more or different fields than those illustrated in FIG. 4, without departing from the scope or spirit of the invention.

Type 402 provides information pertaining to a classification of Internet Control Message Protocol (ICMP) options employed for inter-access router communication, and IPv6 destination options for mobile node-access router communication. Type 402 field options enable handling of resource information between access routers. Resource information provides information about each network resource that is accessible to a mobile node. As illustrated in FIG. 4, type 402 is set to the Seamless Handover Reply (SHREP) option. SHREP options enable a current access router to communicate resource information associated with the mobile node to a new access router as part of a seamless handover. Although a SHREP option is described, the present invention may also employ an Unsolicited SHREP (U-SHREP) option, or a SHIN option, without departing from the scope or spirit of the invention.

Naddr 410 represents an access IP address of the mobile node when it is associated with a link served by a new access router, such as new access router 106 in FIG. 1.

Paddr 412 represents an access IP address of the mobile node when it is associated with a link served by a current access router, such as current access router 104 in FIG. 1.

PRT Sub Option 414 is described in more detail below in conjunction with FIG. 5. Briefly, however, PRT Sub Option 414 represents the resources that the mobile node may access while within the agent's authorization domain.

Figure 5:
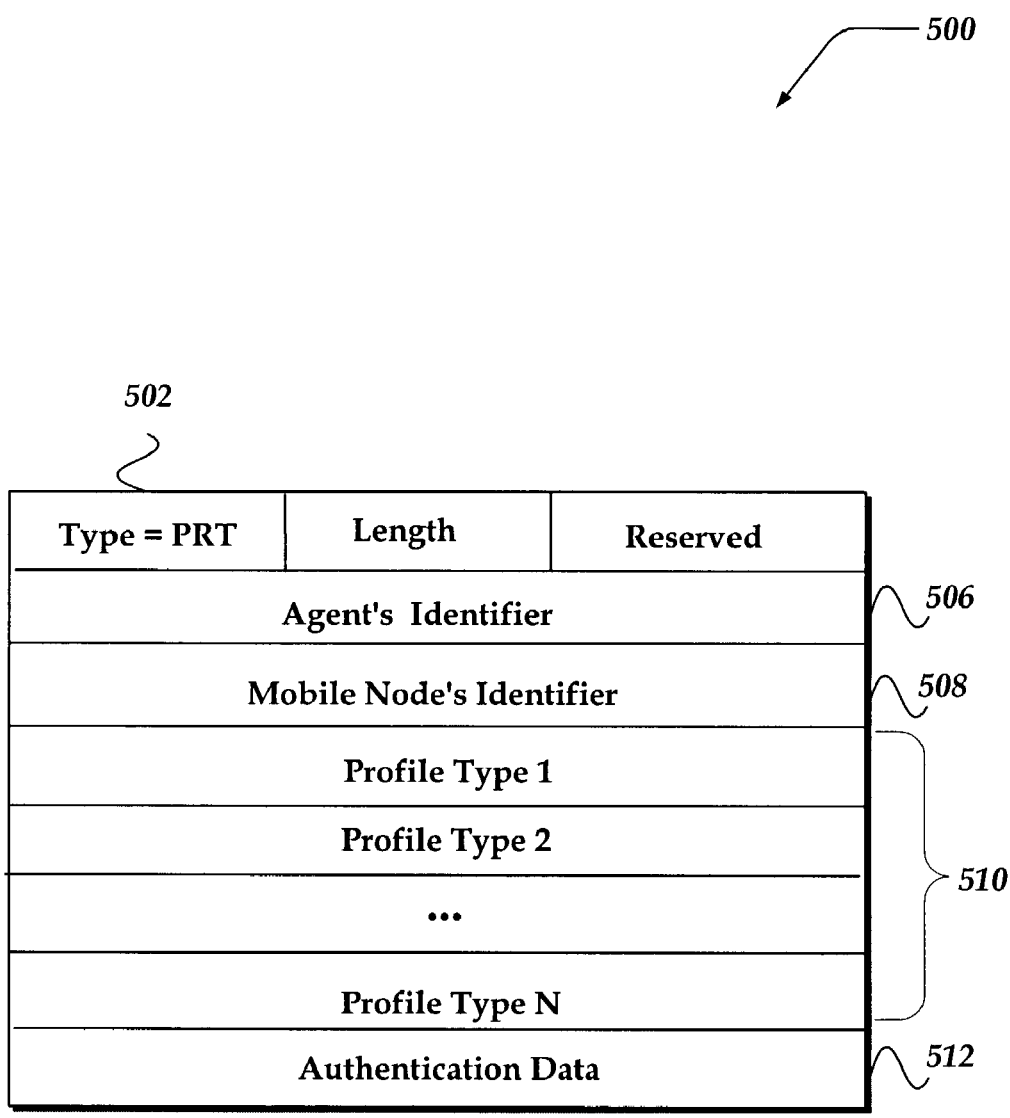
FIG. 5 is a graphical representation of a data structure or packet for the policy resource token sub option of FIG. 4, in accordance with aspects of the invention.

FIG. 5 is a graphical representation of a data structure or packet for the policy resource token (PRT) Sub Option of FIG. 4. As shown in the figure, PRT data structure 500 includes fields for a type 502, agent's identifier 506, mobile node's identifier 508, Profile Types$_{1-N}$ 510, and authentication data 512. PRT data structure 500 may include more or different fields than those illustrated in FIG. 4, without departing from the scope or spirit of the invention.

Agent's identifier 506 represents the identification of an agent providing authorization to the mobile node. In one embodiment of the invention, agent's identifier 506 is a network access identifier (NAI) of the agent.

Mobile node's identifier 508 represents the identification of the mobile node seeking access to the network resources. In one embodiment, mobile node's identifier 508 is an IPv6 address of the mobile node on an access router which first grants network access to the mobile node within a given authorization domain. In another embodiment, mobile node's identifier 508 is a network access identifier (NAI) of the mobile node. Mobile node's identifier 508 also provides for replay protection.

Profile Types$_{1-N}$ 510 represents a set of network resources that a mobile node is eligible to access within the authorization domain. For example, Profile Types$_{1-N}$ 510, may include, but are not limited to, Quality of Service (QoS), header compression, buffering, and security. By providing such information to the new access router if a handover occurs, the latencies in obtaining authorized access to resources may be reduced. In one embodiment, each profile type$_{1-N}$ 510 is a 32-bit field that is associated with a resource that a mobile node (MN) is allowed to access. The invention is configured to enable a new profile type 510 to be defined, and an existing resource type to be encoded as a profile type 510.

Authentication data 512 represents information that may be employed to authenticate the source and integrity of PRT data structure 500. In one embodiment, authentication data 512 employs a Keyed-Hashing for Message Authentication (HMAC) secret key authentication algorithm in conjunction with a Secure Hash Algorithm (SHA), a Message Hash Digest 5 (MD5), or the like. However, the invention is not limited to HMAC algorithms, and any mechanism providing message integrity and authentication may be employed.

A secret encryption key of the agent is typically employed to cryptographically sign PRT data structure 500 so that an access router or mobile node may determine its origin.

Moreover, PRT data structure 500 has a valid lifetime associated with it that is typically about the same as the lifetime of the network access.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. An apparatus for managing access to a network resource, comprising:
    (a) a network interface that employs a packet-based protocol to send and receive packets; and
    (b) a router for enabling a mobile node to access the network resource, wherein the router performs actions, including:
    forwarding a request for access to the network resource;
    receiving a single instance of a token from an agent in response to the request; and
    handing over the mobile node to another router without requiring validation of the single instance of the token for the handover, and providing the single instance of the token to the other router, wherein the other router validates the single instance of the token based on the agent's public non-symmetric key and employs the validated single instance of the token to determine what network resource the mobile node is authorized to access.

2. The apparatus of claim 1, wherein providing the single instance of the token to the other router further comprises providing the token from the router after a security association is established between the router and the other router.

3. The apparatus of claim 2, wherein providing the single instance of the token from the router further comprises associating the single instance of the token with a Seamless Handover Reply (SHREP) Option message.

4. The apparatus of claim 1, wherein providing the single instance of the token to the other router further comprises providing the single instance of the token from the mobile node without establishing a security association between the other router and the mobile node.

5. The apparatus of claim 4, wherein providing the single instance of the token from the mobile node further comprises associating the single instance of the token with a Seamless Flandover Initiate Destination (SHIN) Option message.

6. The apparatus of claim 1, wherein the router and the other router share a common security association.

7. The apparatus of claim 1, wherein forwarding the request for access further comprises forwarding the request to the agent.

8. The apparatus of claim 1, wherein receiving the single instance of the token in response to the request further comprises receiving an Authorization Authentication and Accounting (AAA) Client Answer (ACA) associated with the single instance of the token.

9. A method for managing access to a network resource, comprising:
    receiving a request for access to the network resource;
    providing a single instance of a token from an agent to a first router in response to the request, wherein the token comprises an authorization profile type; and
    handing over the mobile node to a second router without requiring validation of the single instance of the token for the handover, and forwarding the single instance of the token to the second router independent of a security association, wherein the second router validates the single instance of the token based on the agent's public non-symmetric key and employs the validated single instance of the token to determine what network resource the mobile node is authorized to access.

10. The method of claim 9, wherein forwarding the token further comprises providing the token from the first router.

11. The method of claim 10, wherein providing the token from the first router further comprises associating the token with a Seamless Flandover Reply (SHREP) Option message.

12. The method of claim 9, wherein the forwarding the token further comprises providing the token from the mobile node.

13. The method of claim 12, wherein providing the token from the mobile node further comprises associating the token with a Seamless Handover Initiate Destination (SHIN) Option message.

14. The method of claim 9, wherein the first router and the second router share a common security association.

15. The method of claim 9, wherein providing the token to the first router further comprises associating the token with an Authorization Authentication and Accounting (AAA) Client Answer (ACA).

16. A method for managing access to a network resource, comprising:
receiving a request for access to the network resource;
providing a single instance of token to a first router in response to the request, wherein the single instance of the token comprises an authorization profile type that includes at least one of a QoS profile type, a header compression profile type, a buffering profile type, and a security profile type;
enabling a mobile node to access the network resource associated with the single instance of the token; and
if the mobile node is handed over to a second router, forwarding the single instance of the token to the second router after a security association is established, wherein the second router validates the forwarded single instance of the token based on the agent's public non-symmetric key and employs the validated single instance of the token to determine what network resource the mobile node is authorized to access.

17. The method of claim 16, wherein the token is cryptographically signed.

18. The method of claim 16, wherein the token is encrypted using Keyed-Hash Message Authentication Code (HMAC).

19. The method of claim 16, wherein the token further comprises an identifier associated with the mobile node, wherein the identifier is at least one of a network access identifier (NAI) of the mobile node, and an IPv6 address of the mobile node.

20. A system for enabling a mobile node to access a network resource, comprising:
an agent that is configured to provide a single instance of a token in response to a request for access to the network resource, wherein the token comprises an authorization profile type;
a first router that is configured to forward the request for access to the network resource to the agent, and to employ the single instance of the token to enable the mobile node to access the network resource; and
a second router that is configured to receive the single instance of the token independent of a security association if the mobile node is handed over to the second router, wherein the second router validates the single instance of the token based on the agent's public non-symmetric key and employs the validated single instance of the token to determine what enable network resource the mobile node is authorized to access.

21. The system of claim 20, wherein at least one of the first router and the second router is an access router.

22. The system of claim 20, wherein the agent is operative as one of an Authorization Authentication and Accounting (AAA) server, a RADIUS server, and a Kerberos server.

23. The system of claim 20, wherein the token is a policy resource token.

24. The system of claim 20, wherein the request for access to the network resource includes an identifier of the mobile node.

25. The system of claim 20, wherein the first router and the second router share a common security association.

26. The system of claim 20, wherein the token is associated with an Authorization Authentication and Accounting (AAA) Client Answer (ACA) if the token is provided to the first router.

27. The system of claim 20, wherein the second router receives the token from the first router in the process of handing over the mobile node to the second router.

28. The system of claim 20, wherein the token is associated with a Seamless Handover Reply (SHREP) Option message if the token is provided from the first router to the second router.

29. The system of claim 20, wherein the second router receives the token from the mobile node.

30. The system of claim 20, wherein if the token is communicated from the mobile node to the second router the token is associated with a Seamless Handover Initiate Destination (SHIN) Option message.

31. A system for enabling a mobile node to access a network resource, comprising:
an agent that is configured to provide a single instance of a token in response to a request for access to the network resource, wherein the single instance of the token comprises an authorization profile type that includes at least one of a QoS profile type, a header compression profile type, a buffering profile type, and a security profile type;
a first router that is configured to forward the request for access to the network resource to the agent, and to employ the single instance of the token to enable the mobile node to access the network resource; and
a second router that is configured to receive the single instance of the token independent of a security association, if the mobile node is handed over to the second router, wherein the second router employs the received single instance of the token to validate the single instance of the token based on the agent's public non-symmetric key and employs the validated single instance of the token to determine what network resource the mobile node is authorized to access.

32. The system of claim 20, wherein the token is cryptographically signed by the agent.

33. The system of claim 20, wherein the token is encrypted using Keyed-Hash Message Authentication Code (HMAC).

34. The system of claim 20, wherein the token further comprises an identifier associated with the mobile node, wherein the identifier is one of a network access identifier (NAI) of the mobile node, and an IPv6 address of the mobile node.

35. The system of claim 20, wherein the token comprises an identifier associated with the agent, wherein the identifier is selected from the group consisting of a network access identifier, and an IPv6 address of the agent.

36. A computer-readable medium encoded with a data structure for use in enabling a mobile node to access a plurality of network resources, the data structure comprising:
- a first data field including an address of a mobile node when associated with a previous router;
- a second data field including an address of the mobile node when associated with a new router and independent of a security association, wherein the mobile node has transitioned from the address identified in the first data field; and
- a third data field including a single instance of a token employable by the mobile node for accessing at least one of the plurality of network resources and using the address identified in the second data field, wherein the single instance of the token comprises a profile type that includes at least one of a QoS profile type, a header compression profile type, a buffering profile type, and a security profile type, and wherein an agent's public non-symmetric key is useable by the new router to validate the single instance of the token and the validate single instance of the token is used to determine which of the plurality of network resources the mobile node is authorized to access.

37. The computer-readable medium of claim 36, wherein the third data field further comprises an identifier of an agent enabling authorization to the plurality of network resources.

38. The computer-readable medium of claim 36, wherein the third data field further comprises an identifier of a mobile node requesting authorization to at least one network resource in the plurality of network resources.

39. The computer-readable medium of claim 36, wherein the third data field further comprises a plurality of profile types, wherein each of the plurality of profile types includes information for enabling access to at least one of the plurality of network resources.

* * * * *